United States Patent [19]

Meisinger

[11] Patent Number: 4,921,282
[45] Date of Patent: May 1, 1990

[54] UNDERMODERATED NUCLEAR REACTOR

[75] Inventor: Stanlee W. Meisinger, Golden Valley, Minn.

[73] Assignee: FasTest Incorporated, St. Paul, Minn.

[21] Appl. No.: 356,625

[22] Filed: May 19, 1989

Related U.S. Application Data

[63] Continuation of Ser. No. 96,392, Sep. 11, 1987.

[30] Foreign Application Priority Data

Feb. 16, 1984 [FR] France .................. 84 02329

[51] Int. Cl.$^5$ ............................................. F16L 17/02
[52] U.S. Cl. .................................. 285/104; 285/315; 285/351; 285/918; 285/924
[58] Field of Search ............... 285/315, 316, 321, 276, 285/277, 104, 105, 113, 918, 924, 351, 900

[56] References Cited

U.S. PATENT DOCUMENTS

| | | |
|---|---|---|
| Re. 27,364 | 5/1972 | German . |
| 2,283,975 | 5/1942 | Dillon ................ 285/104 |
| 2,346,051 | 4/1944 | Seamark .......... 285/104 X |
| 2,819,733 | 1/1958 | Maisch . |
| 3,104,088 | 9/1963 | Cator . |
| 3,127,149 | 3/1964 | Cruse . |
| 3,140,072 | 7/1964 | Sciuto, Jr. . |
| 3,291,152 | 12/1966 | Comer . |
| 3,291,442 | 12/1966 | Cranage . |
| 3,422,980 | 1/1969 | Richardson . |
| 3,423,063 | 1/1969 | Greman . |
| 3,434,745 | 3/1969 | Jackman . |
| 3,453,005 | 7/1969 | Foults . |
| 3,477,688 | 11/1969 | Cruse . |
| 3,534,776 | 10/1970 | Gilreath . |
| 3,540,760 | 11/1970 | Miller et al. . |
| 3,727,952 | 4/1973 | Richardson . |
| 3,738,688 | 6/1973 | Racine . |
| 3,757,836 | 9/1973 | Masuda . |
| 3,779,587 | 12/1973 | Racine . |
| 3,799,207 | 3/1974 | Richardson et al. . |
| 3,868,132 | 2/1975 | Racine . |
| 3,870,332 | 3/1975 | Eaton . |
| 3,964,771 | 6/1976 | Baudouin . |
| 3,973,752 | 8/1976 | Boelkins . |
| 4,063,760 | 12/1977 | Moreiras . |
| 4,084,843 | 4/1978 | Gassert . |
| 4,129,324 | 12/1978 | Jones, Jr. . |
| 4,154,465 | 5/1979 | Van Meter . |
| 4,219,222 | 8/1980 | Brusadin . |
| 4,225,159 | 9/1980 | Van Meter . |
| 4,254,801 | 3/1981 | Gerthoffer et al. . |
| 4,326,407 | 4/1982 | Van Meter et al. . |
| 4,437,647 | 3/1984 | Cruse . |
| 4,443,028 | 4/1984 | Hayes . |
| 4,497,343 | 2/1985 | Brown et al. . |
| 4,506,863 | 3/1985 | Quin et al. . |
| 4,540,021 | 9/1985 | Rogers . |
| 4,540,201 | 9/1985 | Richardson . |
| 4,543,995 | 10/1985 | Weh et al. . |
| 4,548,427 | 10/1985 | Press et al. . |
| 4,591,192 | 5/1986 | Van Exel et al. . |
| 4,615,545 | 10/1986 | Cruse . |
| 4,643,466 | 2/1987 | Conner et al. . |
| 4,647,081 | 3/1987 | Landgraf et al. . |

OTHER PUBLICATIONS

Ramer Test Tools, Inc. (copy of 18 page brochure, identified as Exhibit D).
Ramer Products, Inc. (copy of 10 page brochure, identified as Exhibit E).
Tuthill, "Quick Seal", Test Plugs and Filling Connectors for Pressure Testing, dated 1978 (copy of 16-page brochure).
Ramer Test Tools, Inc. (copy of brochure).
Sealing Threads, Pipes and Ports: FasTest TM (Copy of 16 page brochure, identified as Exhibit A).
Production Control Units, Inc.'s Disassembly/Assembly Instructions for Field Servicing and Storing of "TQC" Coupler-Series 500861, 501061, 501261 (identified as Exhibit B).
PCU-Product Bulletin 122R-Quick Connect Process Couplings (identified as Exhibit C).

*Primary Examiner*—Dave W. Arola
*Attorney, Agent, or Firm*—Merchant, Gould, Smith, Edell, Welter & Schmidt

[57] ABSTRACT

A coupling for use with an insert. The coupling including a latching sleeve unbalanced under pressure and a release sleeve for venting pressure.

21 Claims, 3 Drawing Sheets

4,921,282

UNDERMODERATED NUCLEAR REACTOR

This is a continuation of application Ser. No. 096,392, filed Sept. 11, 1987 and now abandoned.

TECHNICAL FIELD OF THE INVENTION

The present invention relates to quick connect couplings having integral pressure assisted sealing for use in interconnecting and/or capping fluid lines such as expanded tubing.

BACKGROUND OF THE INVENTION

Current methods for temporarily connecting to or capping expanded tubing or other similar male shapes made of a material which is not readily deformable; e.g., expanded copper tubing, rigid plastics, hardened steel, etc, are often accomplished with complex, large, or unreliable couplings. Various methods and structures have been used to attach couplings to such tubing. For example, ball and sleeve attachment mechanisms have been used with couplings. In such mechanisms, however, the separation force between the coupling and the tubing is concentrated at the balls which results in a point loading (also referred to as undistributed loading) between the balls and the tubing or other insert. This makes for a relatively weak attachment to the tubing and/or potential deformation of the tubing when the coupling is subjected to high pressure.

In U.S. Pat. No. 4,647,081 to Landgraf et al. there is disclosed a latching mechanism using a resilient ring; however, the latching mechanism is of the point loading nature. The latching mechanism uses a plurality of balls on a female fitting. The balls are covered by a continuous resilient ring which retains the balls in place. The male fitting includes a cooperating groove. When the female fitting is coupled to the male fitting, the resilient spring forces the balls into the groove on the male fitting to latch it in place. The balls make contact with the male fitting at spaced apart locations resulting in a point loading.

Provision of a fluid-tight seal between the couplings and their corresponding tubing is often achieved utilizing a manually applied mechanical loading which is often short-lived and unreliable. Often O-rings are used as the sealing means for coupling mechanisms. Sealing with O-rings is typically accomplished by squeezing an elastomeric ring between the two juxtaposed surfaces where fluid sealing is required. When the seal is formed between the tubing and an interior wall of a coupling bore, it is often required that the tubing have a tapered and smooth surface on the end so as to prevent damage to the O-ring positioned in a wall of the bore upon insertion of the tubing into the bore of the coupling. Often it is not feasible to provide the tubing with such an end. Furthermore, the coupling may be used in existing applications where the tubing end has not been tapered or smoothed.

In those situations where the fluid lines are pressured to a substantial degree, it is often necessary to release the internal air (gas) pressure of the coupled fluid line before disconnecting to prevent rapid separation and the subsequent hazard to personnel. This is normally accomplished by use of external means which is cumbersome and time consuming.

The present invention overcomes the above-enumerated problems and other shortcomings associated with current couplings.

BRIEF DESCRIPTION OF THE DRAWINGS

In the drawings, in which like reference numerals and letters generally indicate corresponding parts throughout the several views.

SUMMARY OF THE INVENTION

Figure 1:
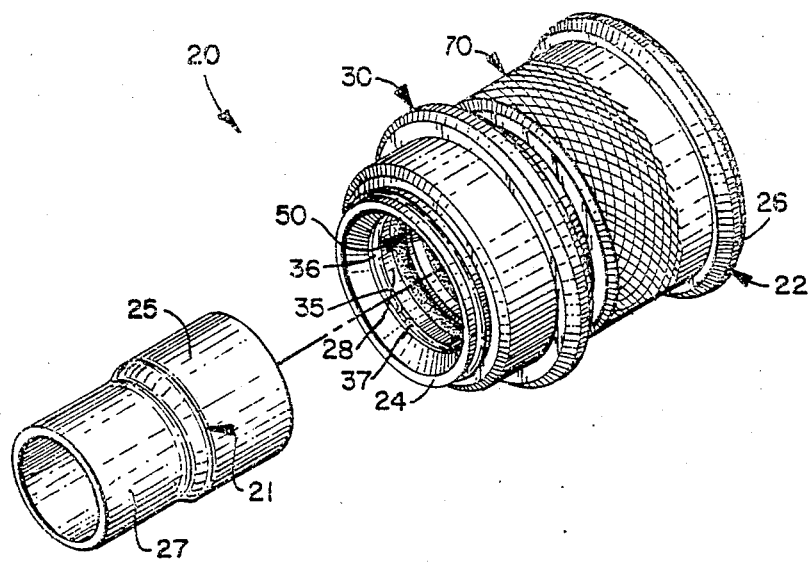
FIG. 1 is a perspective view of an embodiment of a coupling in accordance with the principles of the present invention illustrating the coupling in alignment with a tubular insert of a fluid line.

The present invention relates to a coupling for use with a tubular insert. The coupling has a body with first and second ends and has a bore extending into its first end. An integral attachment mechanism for attaching the body to a tubular insert upon insertion of the tubular insert into the bore includes a spring ring for distributing a separation force about a perimeter of the insert. Fluid pressure in the line is directed longitudinally against said spring ring. An integral pressure-assisted sealing mechanism forms a fluid-tight seal between the connector coupling and the tubular insert.

The present invention also relates to a coupling for use with a tubular insert, the coupling having a body with first and second ends and having a bore extending into its first end, a first groove being defined proximate the first end of the body in a wall of the bore, the first groove extending substantially about the circumference of the bore. An exterior surface of the body includes apertures disposed therein and in communication with the first groove. A spring member is disposed in the first groove, the spring member extending substantially about the circumference of the bore and exerting a force radially outward from the bore. A plurality of individually spaced apart point force members are disposed in the apertures. A latching sleeve member is axially slidable on the exterior surface of the body between first and second positions, the latching sleeve member forcing the point force members radially inwardly into engagement with the spring ring member when in the first position. The spring ring member is forced radially inward into the bore by the point force members when the latching sleeve member is urged to the first position, whereby the spring ring member is reduced in diameter so as to engage the tubular insert inserted into the bore, thereby effectively attaching the coupling to the tubular insert. Seal means is mounted on the body for forming a fluid-tight seal between the body and the tubular insert.

The present invention also relates to a coupling for use with tubular insert, the coupling having a body with first and second ends and having a bore extending into the first end of the housing, a groove being disposed in a wall of the bore and extending about the perimeter of the bore, the groove including first and second portions. An elastomeric O-ring is receivable in the groove. The first portion extends further radially away from the bore than the second portion. The elastomeric O-ring projects into the bore when in the second portion, whereby upon insertion of the tubing into the bore, the O-ring is forced into the first portion of the groove thereby allowing easy insertion of the tubular insert. Upon pressurization of fluid in the insert, the O-ring is forced into the second portion of the groove thereby providing a fluid-tight seal between the bore wall and the tubular insert.

An advantage of one embodiment of the present invention is the connection of the coupling to the tubular insert without premature accidental separation of the tubular insert from the coupling and/or deformation of the tubular insert or coupling due to high fluid pressure.

In one embodiment of the present invention, use at higher pressures is enabled while minimizing deformation or separation by distributing the coupling (latching) force in substantially line contact about the circumference of an expanded shoulder of the tubular insert.

Still another advantage of an embodiment of the present invention is the use of a spring ring which exerts a radial expanding force on point force members which assists in maintaining the latching sleeve in a disconnected position for subsequent connection to the tubular insert once the latching sleeve has been moved to the disconnected position, thereby eliminating the need to check if the latching sleeve needs to be moved (retracted) to the disconnected position prior to connection with a tubular insert.

An advantage of one embodiment of the present invention is the provision of seal means which does not require mechanical loading or other external loading to effectuate a fluid-tight seal. The groove with its first and second portions and the O-ring cooperate to provide automatic loading of the O-ring and thus sealing upon introduction of a pressure median in the tubular insert. Additionally, the groove is configured to minimize damage or premature wear of the O-ring. Also, the location of the first and second portions of the groove can be reversed to allow use with a negative (partial vacuum) media pressure, or the groove could be constructed with a deeper groove portion flanked by two more shallow groove portions, such that use with either positive or negative media pressure is facilitated.

Yet another embodiment of the present invention prevents the latching sleeve from being manually retracted so as to release the tubular insert until the pressure differential between the fluid in the tubular insert and the outside ambient air has been eliminated.

In yet another embodiment, a pressure release sleeve is provided which allows pressure differential to be released upon movement of the pressure release sleeve away from the latching sleeve so as to expose vent apertures. The pressure release sleeve is sealed at both ends by O-ring seals of the same diameter, whereby the pressure release sleeve can be readily moved under pressure.

In one embodiment, the pressure release sleeve slides on an exterior surface of the latching sleeve and forms a seal therewith while the latching sleeve forms a seal with the body of the coupling. In the pressurized connected state, the fluid pressure effects an axial load on the latching sleeve which urges it to remain in the coupled state until the pressure differential has been eliminated.

The above described features and advantages, along with various other advantages and features of novelty, are pointed out with particularity in the claims annexed hereto and forming a part hereof. However, for a better understanding of the invention, its advantages, and objects attained by its use, reference should be had to the drawings which form a further part hereof and to the accompanying descriptive matter in which there is illustrated and described a preferred embodiment of the invention.

DETAILED DESCRIPTION OF PREFERRED EMBODIMENTS OF THE PRESENT INVENTION

Referring now to the drawings, there is illustrated in FIGS. 1 through 4 an embodiment of a coupling 20 in accordance with the principles of the present invention. The coupling 20 includes: a body 22 having first and second ends, 24 and 26 respectively, the body having a bore 28 extending into the first end; an attaching mechanism 30 for releasably attaching a structurally rigid tubular insert 21 to the coupling 20; a sealing mechanism 50 for forming a fluid-tight seal between the body 22 and the tubular insert 21; and a pressure release mechanism 70 for venting pressure differential between the bore 28 and an exterior of the body 22. Although not shown, the tubular insert 21 will typically be part of a fluid line or system utilizing fluids, for example, an expanded tubing line. The fluid in the line might be at varying pressures. The tubular insert 21 might be the end of a piece of expanded tubing or it might be a hardened insert suitably attached to a fluid line such that the insert end of the fluid line is hardened; i.e., does not yield readily to pressure, so that the attaching mechanism 30 and the sealing mechanism 50 will operate with the tubing. Additionally, the tubular insert 21 might be attached to or part of a container or other element of a fluid system.

Figure 2:
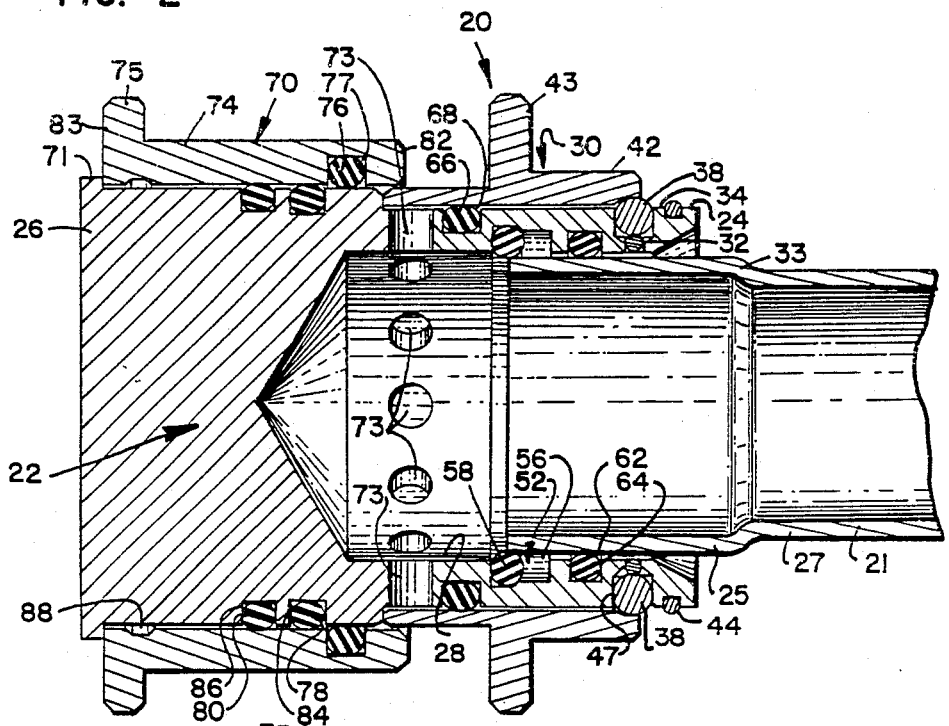
FIG. 2 is an enlarged view in schematic section of the coupling embodiment shown in FIG. 1, the coupling being illustrated in an uncoupled state with a tubular insert being partially inserted therein.
Figure 3:
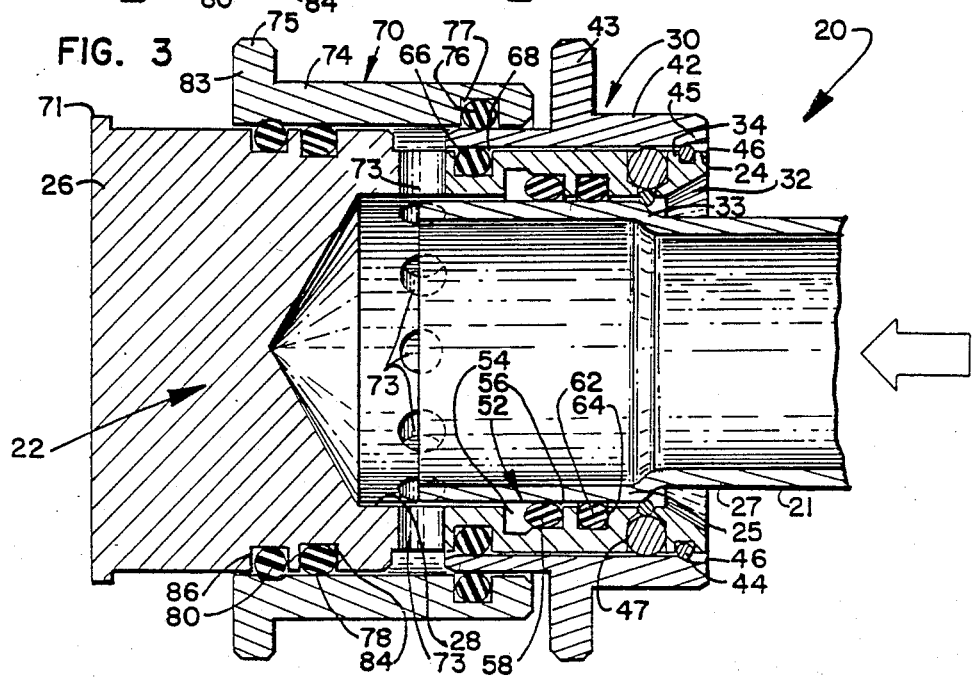
FIG. 3 is a view similar to FIG. 2 with the coupling being illustrated in a coupled state with the tubular insert.

The attaching mechanism 30 of the embodiment shown includes a first groove 32 defined proximate the first end 24 in a wall of the bore 28, the first groove 32 extending about substantially the circumference of the bore. An exterior surface of the body includes a plurality of apertures 34 disposed therein for providing communication between the first groove 32 and the exterior surface of the body 22. An elongated spring ring member 36 is disposed in the first groove 32, the spring ring member 36 extending about substantially the circumference of the bore 28 and distributing a separation force about a circumference of the tubular insert 21. While the spring ring member 36 of the preferred embodiment is of substantially circular construction, it will be appreciated that said spring ring and similar constructs described hereinafter may be of various shapes and/or materials which are capable of performing a similar function. A plurality of individually spaced apart point members 38 (also referred to as balls), are disposed in the apertures 34. It is to be understood that while three point force members are utilized in the preferred embodiment of the invention, any number of point force members may be used without parting from the spirit of the invention. A latching sleeve member 42 is axially slideable on an exterior surface of the body 22 between first and second positions (also referred to as latched and unlatched positions, respectively), as illustrated in FIGS. 3 and 2 respectively. Sliding of the latching sleeve member 42 is facilitated by the presence of a latching sleeve member collar 43 projecting upward from the latching sleeve member's exterior surface and extending about the circumference of the latching sleeve member 42. The latching sleeve member 42 is manually slid toward the first groove 32 to force the point force members 38 radially inward into engagement with the spring ring member 36 when in the first position. The spring ring member 36 is in turn formed radially inward into the bore 28 by point force members 38 when the latching sleeve member 42 is in the first position, whereby the spring ring member 36 is reduced in diameter so as to engage a shoulder portion 33 of the tubular insert 21 between a first portion 25 and a second portion 27 of the tubular insert 21, thereby effectively attaching the coupling 20 to the tubular insert 21. This reduction in diameter is accomplished by use of a spring ring member 36 having first and second ends 35 and 37. The spring ring member 36 is disposed in the first groove 32 with the first end 35 secured against movement and the second end 37 being free to move such that when latching sleeve member 42 is in second position the spring ring member 36 does not extend fully about the interior circumference of the bore 28, so that a gap between the two ends of the spring ring 36 is created. Then, as the latching sleeve member 42 moves toward first position, the second end 37 of the spring ring 36 moves closer to the first, secured, end 35 of the spring ring member 36, thus achieving a reduction in diameter of the spring ring 36 as mentioned above.

The latching sleeve member 42 is prevented from being pushed off the first end 24 of the coupling body 22 by a second spring ring member 44 disposed in a groove on an exterior surface of body 22 intermediate of the first end 24 of the body 22 and the first spring ring member 36 of the attaching mechanism 30. When the latching sleeve member 42 is pushed over the second spring ring member 44 into first position, the spring ring member 44 becomes disposed in an indentation 46 of an interior wall 47 of the latching sleeve member 42 which is located proximate a first end of latching sleeve member 42 and extends substantially about the circumference of latching sleeve member 42. The second spring ring member 44 then engages a shoulder portion 45 of the latching sleeve member 42 and thus retains latching sleeve member 42 on the body 22. The indentation 46 also provides a recess into which point force members 38 slip when latching sleeve member 42 is in the second position, as illustrated in FIG. 2.

The pressure actuated sealing mechanism 50 includes a groove 52 in the wall of bore 28 extending about the circumference of the bore, the groove 52 being disposed between the first groove 32 and the second end 26 of the body 22. The groove 52 includes a first portion 54 and a second portion 56, the first portion 54 extending further radially away from the bore 28 than the second portion 56. An elastomeric O-ring 58 is disposed in the groove 52 and projects into the bore 28 when in the second portion 56. While the cross-section of O-ring 58 is of substantially circular construction in the preferred embodiment, it will be appreciated that said O-ring and other similar constructs described hereinafter may be of various shapes and/or materials which are capable of performing a similar function. For instance, an O-ring might be of substantially square cross-sectional dimensions. Upon insertion of the tubular insert 21 into the bore 28, the O-ring 58 is forced into the first portion 54 and thus allows easy insertion of the tubular insert 21. Upon pressurization of the fluid line, the O-ring 58 is forced by fluid pressure into the second portion 56 of the groove 52 thereby providing an effective fluid-tight seal between the bore wall and the tubular insert 21.

The sealing mechanism 50 further includes a second O-ring 62 which is disposed in a groove 64 located intermediate of the groove 52 and the groove 32 and extending substantially about the circumference of bore 28. The O-ring 62 assists in forming a secondary fluid-tight seal between the bore 28 and the tubular insert 21 and acts as an exclusion device or wiper to prevent contamination, etc., from entering the primary seal upon insertion of the expanded tube.

The sealing mechanism 50 of the preferred embodiment still further includes a third O-ring 66 which is disposed in a groove 68 located intermediate of the groove 52 and apertures 73 in the body 22 and extending substantially about the circumference of the body 22. The O-ring 66 forms a fluid-tight seal between latching sleeve member 42 and the body 22.

The pressure release mechanism 70 includes a plurality of these apertures 73 extending between the bore 28 and an exterior of the body 22, the apertures 73 being located intermediate of the groove 52 and the second end 26 of the body. A pressure release sleeve member 74 is axially slideable along the exterior surface of the body, the pressure release sleeve member 74 sealing the apertures 73 when in the first position and unsealing the apertures 73 when in the second position. Sliding of the pressure release sleeve member is facilitated by the presence of a pressure release sleeve member collar 75 located proximate a second end 83 of the pressure release sleeve member 74, projecting upward from the exterior surface of the pressure release sleeve member 74 and extending about the circumference of the pressure release sleeve member 74. The pressure release sleeve member 74 is prevented from sliding off the body 22 by a collar 71 of the body 22. Pressure differential between the bore 28 and the exterior of the coupling 20 is eliminated by sliding the pressure release sleeve member 74 from the first position into the second position. The pressure release sleeve member 74 includes a groove 77 designed to receive an O-ring 76 which is located proximate a first end 82 of the pressure release sleeve member 74. The O-ring 76 is disposed in groove 77 and cooperates with the pressure release sleeve member 74 and an exterior surface of the latching sleeve member 42 to provide a fluid-tight seal between the sleeve members 74, 42. O-rings 78 and 80 are disposed between the O-ring 76 and the second end 26 of body 22 and reside in grooves 84 and 86 of the body 22.

The groove 86 extends a shorter distance radially inward toward bore 28 than does groove 84, and this fact, combined with the axial positioning of the grooves enables the O-ring 80 of groove 86 to slip into an indentation 88 located proximate the second end 83 of the pressure release sleeve member 74 when the pressure release sleeve member 74 is in the first position, thus releasably retaining the pressure release sleeve member 74 in the first position. O-ring 78 cooperates with the external surface of the body 22 and an interior surface of the pressure release sleeve member 74 to provide a fluid-tight seal between the body 22 and the pressure release sleeve member 74, while O-ring 80 acts to provide detention of the pressure release sleeve member 74 in the two respective sleeve positions.

Figure 4:
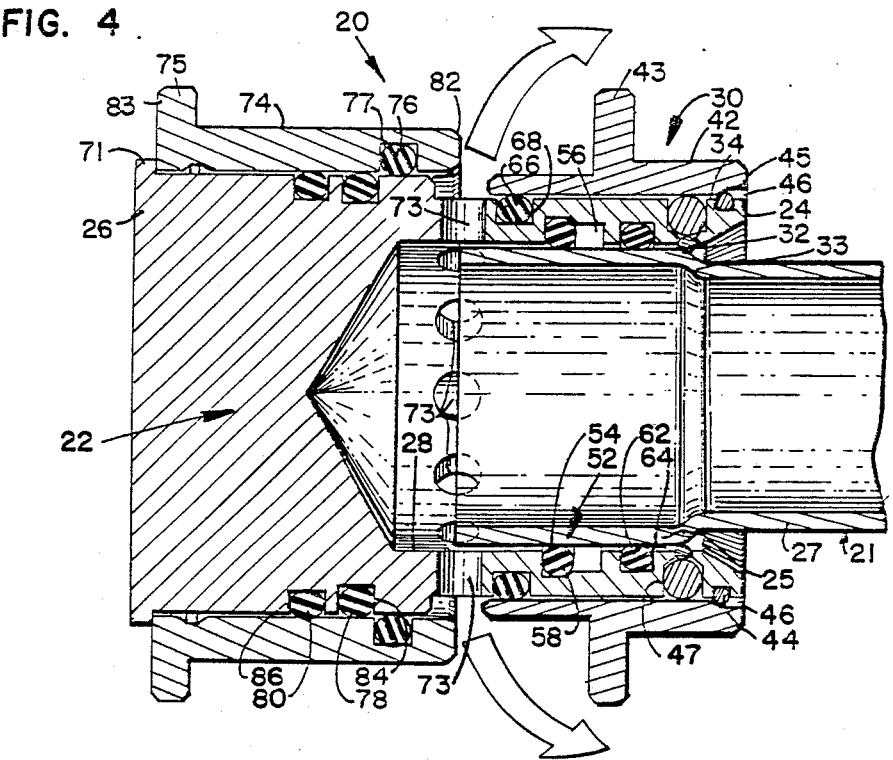
FIG. 4 is a view similar to FIG. 2 with the coupling being illustrated in the coupled state, a pressure release sleeve being positioned to release the fluid pressure in the tubular insert.

In use, the coupling 20 will be first aligned as shown in FIG. 1, about to receive the tubular insert 21. Second, the coupling 20 will be in the position depicted in FIG. 2, with both the latching sleeve member 42 and the pressure release sleeve member 74 in the unlatched position. FIG. 3 demonstrates the third step of the process, as after insertion of the tubular insert 21, both sleeve members 42 and 74 are placed in the latched position. At this point the fluid line may be pressurized, since a fluid tight seal has been effected. Pressurization of the fluid line causes the latching sleeve member 42 to be in an unbalanced condition, i.e., the fluid line pressure exerts a force on the second end of the latching sleeve member 42 which is greater than the force exerted by ambient fluid pressure at the first end, such that it may not be easily moved. Venting of the fluid line prior to unlatching the tubular insert 21 is depicted in FIG. 4, with the latching sleeve member 42 remaining in the first position while pressure release sleeve member 74 is pushed back into the second position. This venting allows the latching sleeve member 42 to return to a balanced condition; i.e., the pressure is substantially the same at both ends of the latching sleeve member 42, so that the latching sleeve member is easily movable. Subsequent positioning of the latching sleeve member 42 in the second position will enable retraction of the tubular insert 21 from the coupling 20.

Figure 6:
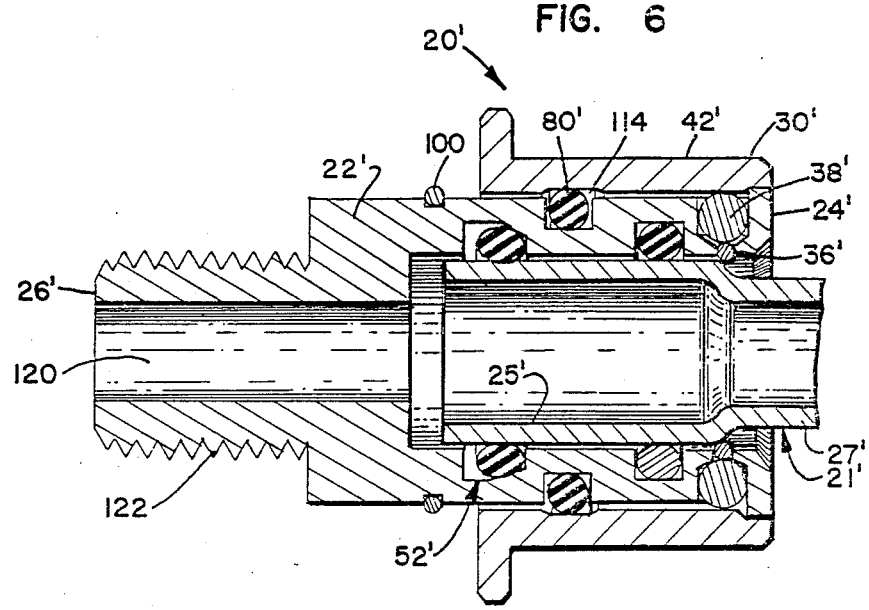
FIG. 6 is a view similar to FIG. 5 with the coupling being illustrated in a coupled state with the tubular insert.
Figure 5:
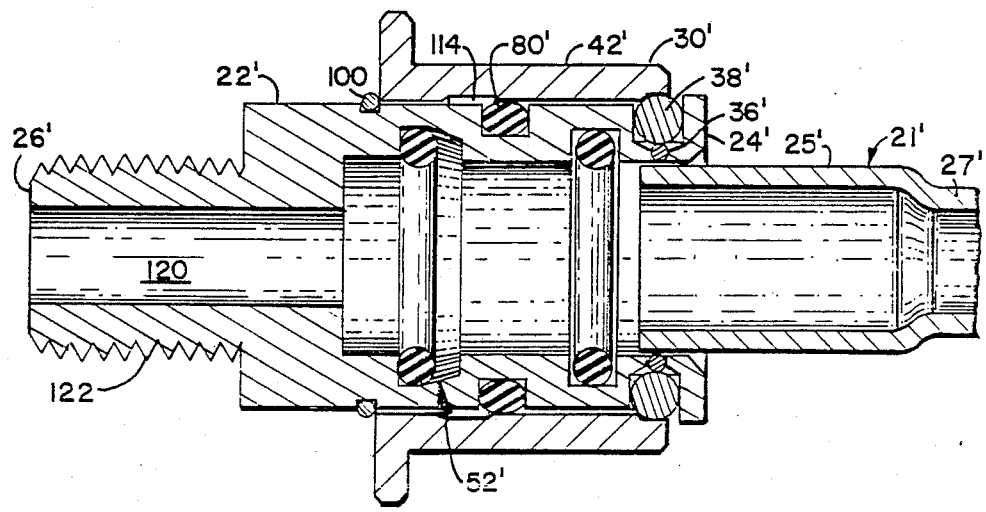
FIG. 5 is an enlarged view in schematic section of an alternative embodiment of a coupling in accordance with the principles of the present invention, the coupling being illustrated in an uncoupled state with a tubular insert being partially inserted therein.

Illustrated in FIGS. 5 and 6 is an alternative embodiment of a coupling 20' in accordance with the principles of the present invention. (Reference numerals which correspond to elements included in the previously-described embodiment remain the same in the description of this embodiment, except that they are designated as primed.) The attaching mechanism 30' of the alternative embodiment includes the provision of a spring ring member 100 disposed substantially about the exterior circumference of the body 22'. Spring ring 100 is the member against which latching sleeve member 42' abuts when latching sleeve member 42' is in second position.

The sealing mechanism 50' of the alternative embodiment is partially accomplished through use of the groove 52' including the first portion 54' and the second portion 56'; however, it will be noted that the first portion 54' slants with a negative slope away from the second portion, rather than having a defined edge, as in the first embodiment. When the latching sleeve member 42' is in first position, the O-ring 80' resides in an indentation 114 of latching sleeve member 42', thus facilitating retention of the latching sleeve member 42' in the latched position.

As illustrated, the second embodiment provides an open end 120 to allow the free flow of fluid through the line and utilizes an externally threaded bore 122. The second embodiment further includes no pressure release mechanism, though it will be appreciated that this embodiment could include such a mechanism. Such an embodiment is particularly adapted for use in lower line pressure situations.

It is to be understood that even though numerous characteristics and advantages of the present invention have been set forth in the foregoing description, together with details of the structure and function of the invention, the disclosure is illustrative only and changes may be made in detail, especially in matters of shape, size and arrangement of parts within the principles of the invention, to the full extent indicated by the broad general meaning of the terms in which the appended claims are expressed.

What is claimed is:

1. An integral attachment means for attaching a coupling body having a bore and first and second ends to an insert upon insertion of the insert into the bore which extends into the first end of the body, the attachment means including spring ring means for distributing a separation force about a perimeter of the insert, a plurality of individually spaced apart point force members, and a latching sleeve member forcing the point force members radially inward into engagement with the spring ring means, forcing said spring ring means radially inward into the bore so as to engage the insert.

2. A coupling for use with an insert, comprising:
  (a) a body having first and second ends, the body having a bore extending into the first end;
  (b) integral attachment means for attaching the body to the insert upon insertion of the insert into the bore, the attachment means including spring ring means for distributing a separation force about a perimeter of the insert, a plurality of individually spaced apart point force members, and a latching sleeve member forcing the point force members radially inward into engagement with the spring ring means, forcing said spring ring means radially inward into the bore so as to engage the insert; and
  (c) integral pressure-assisted sealing means for forming a fluid-tight seal between the connector coupling and the insert.

3. A coupling in accordance with claim 2, further including vent means for venting pressure differential between the bore and the exterior of the body.

4. A coupling in accordance with claim 2, wherein the latching sleeve member is slidable between a latched position wherein the tubular insert is attached to the body and an unlatched position wherein the tubular insert is released, the latching sleeve being biased in the latched position by internal fluid pressure.

5. A coupling for use with an insert, comprising:
  (a) a body having first and second ends, the body having a bore extending into the first end, a first groove being defined proximate the first end in a wall of the bore, the first groove extending substantially about the perimeter of the bore, an exterior surface of the body including apertures disposed therein for providing communication between the first groove and the exterior surface of the body;
  (b) a spring member being disposed in the first groove, the spring member extending about substantially the perimeter of the bore and exerting a force radially outward from the bore;
  (c) a plurality of individually spaced apart point force members being disposed in the apertures;
  (d) a latching sleeve member being axially slidable on the exterior surface of the body between first and second positions, the latching sleeve member forcing the point force members radially inward into engagement with the spring ring member when in the first position, the spring ring member being forced radially inward into the bore by the point force members when the latching sleeve member is in the first position, whereby the spring ring member is reduced in diameter so as to engage the insert, thereby effectively attaching the coupling to the insert; and
  (e) pressure assisted means for forming a fluid-tight seal between the body and the insert.

6. A coupling in accordance with claim 5, further including vent means for venting pressure differential between the bore and the exterior of the body.

7. A coupling in accordance with claim 5, wherein the vent means includes an aperture extending between the bore and the exterior of the body, the aperture being located intermediate of the seal means and the second end of the body, a pressure release sleeve member being axially slidable along the exterior surface of the body between first and second positions, the pressure release sleeve member, including sealing means, being disposed intermediate of the latching sleeve member and the second end of the body, the pressure release sleeve member sealing the aperture when in the first position and unsealing the aperture when in the second position, whereby pressure differential between the bore and the exterior of the pressure release sleeve member is eliminated by sliding the pressure release sleeve member from the first position into the second position, whereby when such elimination of pressure differential occurs, the latching sleeve member is in a balanced condition, such that it may easily be moved.

8. A coupling in accordance with claim 5, wherein the seal means for providing a fluid-tight seal with the insert includes a second groove in the bore wall extending about the perimeter of the bore, the second groove being disposed between the first groove and the second end of the body, the second groove including a first portion and a second portion, the first portion extending further radially away from the bore than the second portion, an elastomeric O-ring being disposed in the second groove and projecting into the bore when in the second portion, whereby upon insertion of the insert into the bore, the O-ring is forced into the first portion and allows easy insertion of the insert and whereby upon pressurization of the fluid line, the O-ring is forced by fluid pressure into the second portion of the second groove thereby providing an effective fluid-tight seal between the bore wall and the insert.

9. A coupling in accordance with claim 8, further including vent means for venting pressure differential between the bore and the exterior of the sleeve.

10. A coupling in accordance with claim 9, wherein the vent means includes an aperture extending between the bore and the exterior of the coupling body, the aperture being located intermediate of the second groove and the second end of the body, a pressure release sleeve member being axially slidable along the exterior surface of the body between first and second positions, the pressure release sleeve member being disposed intermediate of the latching sleeve member and the second end of the body, the pressure release sleeve member including second seal means cooperating with the pressure release sleeve member and the latching sleeve member for providing a fluid-tight seal between the pressure release sleeve member and the latching sleeve member, the pressure release sleeve member further including third seal means disposed between the second seal means and the second end of the body, the third seal means cooperating with the external surface of the body and the pressure release sleeve member for providing a fluid-tight seal between the body and the pressure release sleeve member, the pressure release sleeve member sealing the aperture when in the first position and unsealing the aperture when in the second position, whereby pressure differential between the bore and the exterior of the coupling body is eliminated by sliding the pressure release sleeve member from the first position into the second position.

11. A coupling in accordance with claim 10, wherein the pressure release sleeve member partially overlaps the latching sleeve member when the pressure release sleeve member is in the first position, the latching sleeve member including fifth seal means cooperating with the external surface of the body and the latching sleeve member providing a fluid-tight seal between the body and the latching sleeve member, whereby when the fluid line is under pressurization, the latching sleeve member is in an unbalanced condition, such that it is not easily able to be moved.

12. A coupling in accordance with claim 11, wherein fourth seal means is spaced apart from the first seal means toward the first end of the coupling body for assisting the first seal means in forming a fluid-tight seal between the bore and the tubular insert and for performing a wiper function, such that contamination is prevented from reaching the first seal means.

13. A coupling in accordance with claim 12, wherein the second end of the body is closed.

14. A coupling in accordance with claim 12, wherein the bore extends from the first end of the body through the body to the second end of the body, thereby providing a fluid-tight pathway through the coupling.

15. A coupling for use with an insert, comprising:
(a) a body having first and second ends, the body having a bore extending into the first end of the body, a groove being disposed in a wall of the bore and extending about the perimeter of the bore, the groove including first and second portions, the first portion extending further radially away from the bore than the second portion, an elastomeric O-ring being disposed in the groove and projecting into the bore when in the second portion, whereby upon insertion of the insert into the bore, the O-ring is forced into the first portion and allows easy insertion of the insert and whereby upon pressurization of fluid in the insert, the O-ring is forced into the second portion of the groove thereby providing a fluid-tight seal between the bore wall and the insert; and
(b) attachment means for attaching the body to the insert upon insertion of the insert into the bore the attachment means including spring ring means for distributing a separation force about a perimeter of the insert, a plurality of individually spaced apart point force members, and a latching sleeve member forcing the point force members radially inward into engagement with the spring ring means, forcing said spring ring means radially inward into the bore so as to engage the insert.

16. A coupling in accordance with claim 15, further including vent means for venting pressure differential between the bore and the exterior of the body.

17. A coupling in accordance with claim 16, wherein the vent means includes an aperture extending between the bore and the exterior of the body, the aperture being located intermediate of the groove and the second end of the body, a pressure release sleeve member including sealing means, said pressure release sleeve member being axially slidable along the exterior surface of the body between first and second positions, the pressure release sleeve member sealing the aperture when in the first position and unsealing the aperture when in the second position, whereby pressure differential between the bore and the exterior of the body is eliminated by sliding the pressure release sleeve member from the first position into the second position.

18. A coupling for use with an insert, comprising:
(a) a body having first and second ends, the body having a bore extending into the first end;
(b) integral attachment means for attaching the body to the insert;
(c) a latching sleeve member being axially slidable on the exterior surface of the body between first and second positions, the latching sleeve member forcing the attachment means inward into the bore when the latching sleeve member is in the first position, whereby the attachment means is reduced in diameter so as to engage the insert, thereby effectively attaching the coupling to the insert;
(d) seal means for forming a fluid-tight seal between the body and the insert; and
(e) vent means for venting pressure differential between the bore and an exterior of the body, the vent means being located intermediate of the seal means and the second end of the body, a substantially balanced pressure release sleeve member being axially slidable along the exterior of the body between first and second positions, the pressure release sleeve member being disposed intermediate of the latching sleeve member and the second end of the body, the pressure release sleeve member sealing the vent means when in the first position and unsealing the vent means when in the second position, whereby pressure differential between the bore and the exterior of the pressure release sleeve member is eliminated by sliding the pressure release sleeve member from the first position into the second position, whereby when such elimination of the pressure differential occurs, the latching sleeve member is in a balanced condition, such that it may be easily moved, prior to elimination of the pressure differential the latching sleeve member being unbalanced and retained in the first position by internal fluid pressure.

19. A coupling in accordance with claim 18, wherein the seal means is a pressure assisted seal.

20. A coupling for use with an insert, comprising:
(a) a body having first and second ends, the body having a bore extending into the first end, a first groove defined proximate the first end in a wall of the bore, the first groove extending substantially about the perimeter of the bore, an exterior surface of the body including apertures disposed therein for providing communication between the first groove and the exterior surface of the body:
(b) a spring member being disposed in the first groove, the spring member extending about substantially the perimeter of the bore and exerting a force radially outward from the bore;
(c) a plurality of individually spaced apart point force members being disposed in apertures;
(d) a latching sleeve member being axially slidable on an exterior surface of the body between first and second positions, the latching sleeve member forcing the point force members radially inward into engagement with the spring ring member when in the first position, the spring ring member being forced radially inward into the bore by the point force members when the latching sleeve member is in the first position, wherein the spring ring member is reduced in diameter so as to engage the insert, thereby effectively attaching the coupling to the insert; and
(e) seal means for forming a fluid-tight seal between the body and the insert.

21. A coupling in accordance with claim 20 wherein the seal means is a pressure assisted seal.

* * * * *

UNITED STATES PATENT AND TRADEMARK OFFICE
CERTIFICATE OF CORRECTION

PATENT NO. : 4,921,282

DATED : May 1, 1990

INVENTOR(S) : Stanlee W. Meisinger

It is certified that error appears in the above-identified patent and that said Letters Patent is hereby corrected as shown below:

Front page and Column 1, the title should be
-- QUICK CONNECT COUPLING HAVING INTEGRAL PRESSURE
ASSISTED SEALING --

Column 5, Line 12

"formed" should be -- forced --

Column 10, Line 45 after "bore" insert -- , --

Front Page & Column One -

No foreign priority is claimed.

Delete "FOREIGN APPLICATION PRIORITY DATA
Feb. 16, 1984(FR) France ....84 02329"

Signed and Sealed this

Sixth Day of August, 1991

*Attest:*

HARRY F. MANBECK, JR.

*Attesting Officer*   *Commissioner of Patents and Trademarks*